June 17, 1930.  B. F. ARPS  1,764,671
TRACTION BELT
Filed Sept. 6, 1927
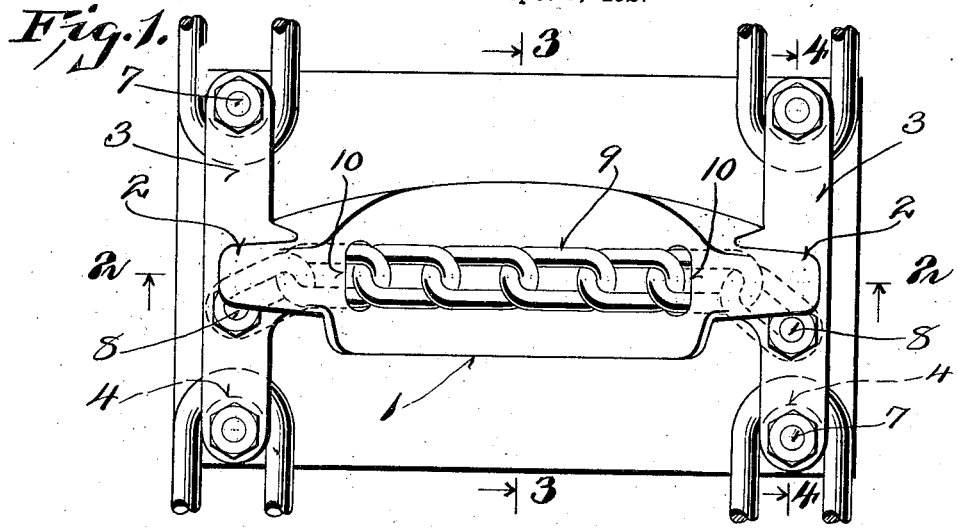
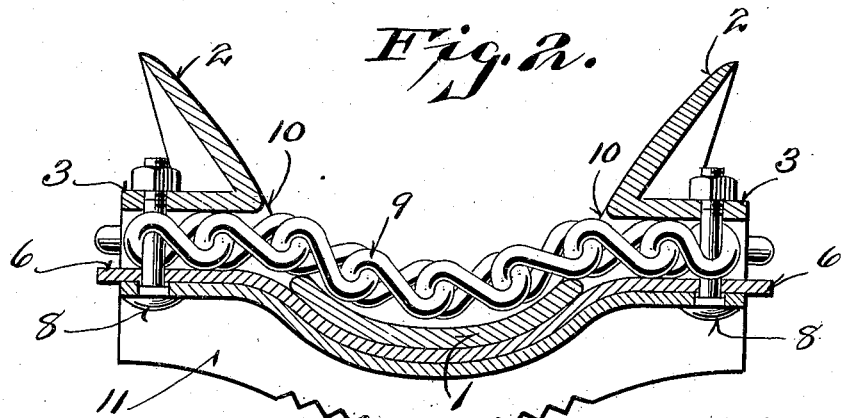
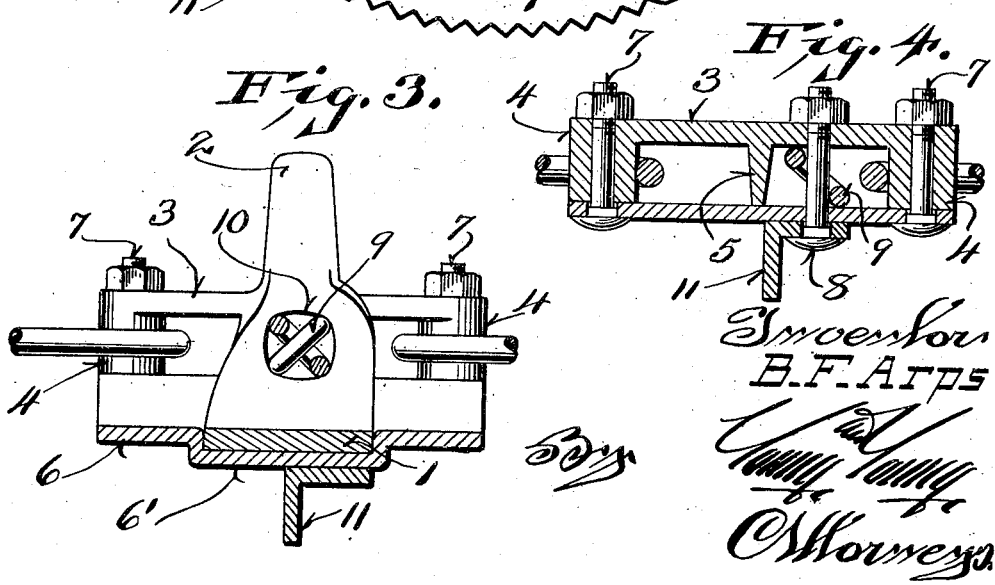
Inventor
B. F. Arps Patented June 17, 1930

1,764,671

UNITED STATES PATENT OFFICE

BRUNO F. ARPS, OF NEW HOLSTEIN, WISCONSIN

TRACTION BELT

Application filed September 6, 1927. Serial No. 217,710.

This invention relates to traction belts, such for example, as traction belts used on automobiles adapted to travel in snow or upon other insecure footing.

Objects of this invention are to provide a novel form of traction belt in which the units are each equipped with transverse chains which engage the tires of the driving wheels and act in the nature of anti-skid chains to prevent relative slipping between the driving wheels and the traction belt, and to provide a single piece rigid yoke supporting the chain and acting as a connecting member for the successive links of the side chains so that even if one of the bolts attaching the parts together may become lost, the integral yoke will still hold the successive links and prevent parting of the belt.

A further object is to provide a traction belt having chains as outlined immediately above in which the chains form the normal contacting agent for the tire and support the weight of the tire, thus securing maximum gripping between the tire and the belt.

Another object is to provide a traction belt in which each of the units is provided with a shoe having a relatively wide face to prevent sinking into the snow and in which either an integral or a separate transverse rib is provided and equipped with a curved lower surface to engage the snow and secure traction or else to engage an icy surface and, due to its curved contour, cut into the ice and prevent slipping.

An embodiment of the invention is shown in the accompanying drawings in which:

Figure 1 is an inner plan view of one of the units of the traction belt;

Figure 2 is a sectional view on the line 2—2 of Figure 1;

Figure 3 is a sectional view on the line 3—3 of Figure 1;

Figure 4 is a sectional view on the line 4—4 of Figure 1.

Referring to the drawings, it will be seen that a yoke piece 1 is provided and is equipped with a depressed central portion and a pair of upstanding outwardly slanting guiding wings or ears 2 to guide the unit with reference to the driving wheel. This yoke piece is provided with outwardly projecting arms 3 which are integral and are themselves provided with integral downwardly extending link receiving posts 4, as shown most clearly in Figures 1 and 4. If desired, the arms 3 may be provided with an approximately centrally located strengthening rib 5 (see Figure 4).

A sheet metal shoe piece 6 is secured to the underside of the yoke by means of bolts 7 which pass through the posts 4, as shown most clearly in Figure 4. In addition, intermediate bolts 8 pass through the shoe and the arms 3 of the yoke. These intermediate bolts carry the ends of the transverse chains 9. The chains, as will be noted, pass through apertures 10 formed in the side walls of the yoke and their end links receive the bolts 8. The chains 9 are drawn tight enough between the bolts 8 so that the central portions of the chains are spaced from the central depressed portion of the yoke whereby to provide a greater gripping action on the tire than if the chains were rigid against the yoke. The chains are free from attachment to the device at other points and are free to adjust themselves or move about during the operation of the device, thus preventing packing of snow or icing on the inner side of the belt, and insuring a secure grip upon the traction wheel. It is to be noted that the traction wheels run upon the yokes and are engaged by the chains and thus a very positive grip is attained. The shoe pieces 6, as stated, are preferably made of sheet metal and are centrally depressed, as indicated at 6′ in Figure 3, to accommodate the central portion of the yoke and to make the upper surface of the yoke and of the shoe piece flush.

It is to be noted that a transversely extending rib or angle iron 11 is provided and secured to the underside of the shoe piece 6 by means of the bolts 8. This rib is downwardly curved adjacent its center and not only strengthens the shoe but also provides a cleat adapted to dig into the snow or other insecure footing. The shoe piece 6 prevents sinking into a soft footing. If an icy surface is encountered the curved lug or cleat 11 does not contact with the surface throughout its length but the pressure is localized at its central portion and consequently the lug will dig into the icy surface and secure a firm grip.

It is to be distinctly understood that although the lug has been shown extending straight across the unit that nevertheless it may extend at an angle so that successive shoes have lugs arranged in V-shaped relative positions. This will aid in preventing side slipping. Other expedients obviously could be employed, such as transversely corrugating the rib 11, or, if desired, the rib may be notched as shown in the drawings.

It will be seen that a novel form of traction belt has been provided in which a very secure grip upon the wheel is attained and also in which an extended contact with the snow or other loose footing is also secured.

It will be seen further that there is no possibility of the traction belts slipping either in loose snow or upon a hard icy surface.

It is to be noted further that the construction is such that the loosening or loss of a bolt will not permit the opening up of the belt as the link receiving posts of the yoke will still retain the connecting chains in place.

It is to be noted further that the rib or cleat may be made integral with the shoe instead of separate therefrom, if desired, without departing from the spirit of this invention. This shoe or cleat serves a double purpose. It not only acts in the capacity of a grip upon the ground but also acts as a very efficient brace for the entire shoe or unit.

Although the invention has been described in considerable detail, such description is intended as illustrative rather than limiting as the invention may be variously embodied and as the scope of such invention is to be determined as claimed.

I claim:

1. A device of the class described including a yoke piece having openings in the side walls thereof, and a central depressed portion, upwardly slanting end wings on said yoke projecting above the openings, lateral arms at each end of the yoke and extending from each side, a shoe beneath said yoke with its ends spaced from the arms, bolts connecting the ends of the shoe with the arms, and a chain having its end links passed through the openings in the yoke and connected to one of the bolts at each end of the yoke with the intermediate portion of the chain normally spaced from the central depressed portion of the yoke.

2. A traction belt unit comprising a yoke piece having openings in the side walls thereof and a central depressed portion, upwardly slanting end wings on said yoke projecting above said openings, lateral arms at each end of the yoke and extending from each side, a shoe having a central depressed portion to receive the body of the yoke whereby the upper face of the central portion of the shoe will be disposed flush with the upper face of the central portion of the yoke with the ends of said shoe spaced from said arms, bolts connecting said arms and shoe, and a chain having its end links passed through the openings in the yoke and connected to one of the bolts at each end of the yoke with the intermediate portion of the chain spaced from the central depressed portion of the yoke.

In testimony that I claim the foregoing I have hereunto set my hand at New Holstein, in the county of Calumet, and State of Wisconsin.

BRUNO F. ARPS.